US006759459B2

(12) United States Patent
Lin et al.

(10) Patent No.: US 6,759,459 B2
(45) Date of Patent: Jul. 6, 2004

(54) COLORLESS TONER FORMULATED TO IMPROVE LIGHT FASTNESS OF INK JET PRINTS

(75) Inventors: An-Chung Robert Lin, Cupertino, CA (US); Michael H. Lee, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 9 days.

(21) Appl. No.: 10/145,262

(22) Filed: May 13, 2002

(65) Prior Publication Data

US 2002/0183419 A1 Dec. 5, 2002

Related U.S. Application Data

(62) Division of application No. 09/742,486, filed on Dec. 20, 2000, now abandoned.

(51) Int. Cl.[7] ............................ C08K 5/34; C08K 5/53; C09D 11/12

(52) U.S. Cl. ......................... 524/91; 524/100; 524/102; 524/135; 106/31.47; 106/31.49; 106/31.77; 427/385.5; 427/386; 427/407.1; 427/411; 427/416; 428/474.4; 428/480; 428/484; 428/500

(58) Field of Search .......................... 524/91, 100, 102, 524/135; 106/31.47, 31.49, 31.77; 427/385.5, 386, 407.1, 411, 416; 428/474.4, 480, 484, 500

(56) References Cited

U.S. PATENT DOCUMENTS

| | | | |
|---|---|---|---|
| 5,339,146 | A | 8/1994 | Aslam et al. |
| 5,612,777 | A | 3/1997 | Malhotra |
| 5,804,341 | A | 9/1998 | Kamp et al. |
| 5,847,738 | A | 12/1998 | Tunney et al. |
| 5,905,010 | A | 5/1999 | Kurose et al. |
| 5,919,552 | A | 7/1999 | Malhotra |
| 5,919,592 | A | 7/1999 | Miyamoto et al. |
| 6,056,812 | A | 5/2000 | Tom et al. |

FOREIGN PATENT DOCUMENTS

| | | | |
|---|---|---|---|
| EP | 0829761 | A1 | 3/1998 |
| EP | 0890449 | A1 | 1/1999 |
| JP | 03063282 | AB | 3/1991 |

*Primary Examiner*—Kriellion A. Sanders

(57) ABSTRACT

The present invention is drawn to colorless toner compositions for overcoating a print having an ink jet ink image printed thereon. The colorless toner can comprise: a toner resin and at least two additives independently selected from the group consisting of ultraviolet absorbers, free radical inhibitors, thermal stabilizers, and combinations thereof, wherein the ratio of toner resin to total additive is from 1:1 to 99:1 by weight. The colorless toner can also be comprised of a charge control agent and/or a low-melt wax.

15 Claims, No Drawings

COLORLESS TONER FORMULATED TO IMPROVE LIGHT FASTNESS OF INK JET PRINTS

This is a divisional of application Ser. No. 09/742,486 filed on Dec. 20, 2000 now abandoned which is hereby incorporated by reference herein.

FIELD OF THE INVENTION

The present invention is drawn to coatings for ink jet ink prints to improve the light fastness of a printed image and provide a water-resistant protective coating.

BACKGROUND OF THE INVENTION

In recent years, computer printer technology has evolved to a point where very high resolution images can be transferred to various types of media, including paper. One particular type of printing involves the placement of small drops of a fluid ink onto a media surface in response to a digital signal. Typically, the fluid ink is placed or jetted onto the surface without physical contact between the printing device and the surface. Within this general technique, the specific method that the ink jet ink is deposited onto the printing surface varies from system to system, and can include continuous ink deposit and drop-on-demand ink deposit.

With regard to continuous printing systems, inks used are typically solvent based using solvents such as methyl ethyl ketone and ethanol. Essentially, continuous printing systems function as a stream of ink droplets are ejected and directed by a printer nozzle. The ink droplets are directed additionally with the assistance of an electrostatic charging device in close proximity to the nozzle. If the ink is not used on the desired printing surface, the ink is recycled for later use. With regard to drop-on-demand printing systems, the ink jet inks are typically aqueous based using water and/or glycols as solvents. Essentially, with these systems, ink droplets are propelled from a nozzle by heat or by a pressure wave such that all of the ink droplets ejected are used to form the printed image.

There are several reasons that ink jet printing has become a popular way of recording images on various media surfaces, particularly paper. Some of these reasons include low printer noise, capability of high speed recording, and multi-color recording. Additionally, these advantages can be obtained at a relatively low price to consumers. However, though there has been great improvement in ink jet printing, accompanying this improvement are increased demands by consumers in this area, e.g., higher speeds, higher resolution, full color image formation, increased stability, etc. As new ink jet inks are developed, there have been several traditional characteristics to consider when evaluating the ink in conjunction with a printing surface or substrate. Such characteristics include edge acuity and optical density of the image on the surface, dry time of the ink on the substrate, adhesion to the substrate, lack of deviation of ink droplets, presence of all dots, resistance of the ink after drying to water and other solvents, long term storage stability, and long term reliability without corrosion or nozzle clogging. Though the above list of characteristics provides a worthy goal to achieve, there are difficulties associated with satisfying all of the above characteristics. Often, the inclusion of an ink component meant to satisfy one of the above characteristics can prevent another characteristic from being met. Thus, most commercial inks for use in ink jet printers represent a compromise in an attempt to achieve at least an adequate response in meeting some or all of the above listed requirements.

In general, ink jet inks are either dye- or pigment-based inks. Dye-based ink jet inks generally use a soluble liquid colorant that is usually water-based to turn the media a specific color. Because of their makeup, dye-based inks are usually not waterproof and tend to be more affected by UV light. This results in the color changing over time, or fading. For optimum performance, this type of ink has often required that the proper media be selected in accordance with the application, thus, reducing the choice of media for printing. Conversely, pigmented inks typically use a particulate solid colorant to achieve color. In many cases, the line quality and accuracy of plots produced by pigment-based inks are usually superior to that of dye-based inks. With pigmented inks, solid particles adhere to the surface of the substrate. Once the water in the solution has evaporated, the particles will generally not go back into solution, and are therefore more waterproof. In addition, pigmented inks are much more UV resistant than dye-based inks, meaning that it takes much longer for noticeable fading to occur. Though pigmented inks, in some areas, exhibit superior characteristics, dyes tend to run cleaner, provide better yield, offer better particle size, and are easier to filter. Thus, dye-based inks have been more often used for common applications and have tended to be more chromatic and provide more highly saturated colors.

In order for ink jet prints to effectively compete with silver halide photography, one important improvement that must occur is that ink jet inks must improve their ability to remain stable to light exposure for longer periods of time. At this point in time, photographs typically will last much longer under prolonged light exposure, i.e., about 14–18 years under fluorescent light exposure. Conversely, some of the best ink jet printers will produce prints that last for only about 6–8 years under similar conditions. Particularly, with respect to dye-based ink jet ink, the phenomenon of discoloration occurs even more readily than is typical for pigment-based ink jet inks. However, as described above, dye-based inks are sometimes preferred because they are very convenient to use and have good distinction of color.

In the photographic industry, technologies have been developed which have been reported to last much longer than the typical 14–18 years, and even up to 60 years. However, ink jet print quality has improved steadily in recent years. Under the right circumstances, ink jet prints can look as bright and sharp as silver-halide photos. Thus, it is conceivable that ink jet printing may evolve to be the printing method of choice in the not too distant future. On the other hand, with many current technologies, ink jet prints can smear if they become wet or are overly handled. To stop the smearing, an overcoat can be placed over the print. Using toner to protect an image has been considered previously. For example, U.S. Pat. No. 5,847,738 describes the use of clear toner to overcoat ink jet prints. Additionally, in U.S. Pat. No. 5,804,341, a clear toner overcoat is disclosed for use with silver halide photos. These provide protection against abrasion. Additionally, U.S. Pat. No. 5,612,777 teaches the use of a clear overcoat containing UV absorbers to protect electrophotographic prints.

Additives have also been added to inks as well as coated on paper (prior to printing) to improve lightfastness once the ink is printed on the paper. For example, in U.S. Pat. No. 6,056,812, the entire teachings of which are incorporated herein by reference, an ink additive is disclosed to improve lightfastness and durability of the properties of various inks. As stated, either the additives are added to the ink itself, or the additive is used in a composition that is placed on a substrate prior to printing on the substrate. Thus, once the ink jet ink is printed on the coated substrate, e.g., paper, properties are imparted to the ink that promote lightfastness and durability.

However, none of the prior art provides a toner based coating that is specifically formulated to improve the light fastness of ink jet inks after printing of the characters or image on the substrate. Such a toner based coating, formulated specifically for application after printing can provide increased light fastness as well as provide the added benefit of protecting the prints from water or other damage due to exposure to the elements.

SUMMARY OF THE INVENTION

The present invention is drawn to a colorless toner composition for overcoating a print having an ink jet ink image printed thereon. The colorless toner comprises a toner resin, and at least two additives selected from the group consisting of ultraviolet absorbers, free radical inhibitors, thermal stabilizers, and combinations thereof. The toner resin to additive weight ratio can be from about 1:1 to 99:1 by weight. In a preferred embodiment, one of the at least two additives can be an ultraviolet absorber and the second additive can be selected from the group consisting of free radical inhibitors and thermal stabilizers.

DETAILED DESCRIPTION OF THE INVENTION

Before the present invention is disclosed and described, it is to be understood that this invention is not limited to the particular process steps and materials disclosed herein because such process steps and materials may vary somewhat. It is also to be understood that the terminology used herein is used for the purpose of describing particular embodiments only. The terms are not intended to be limiting because the scope of the present invention limited only by the appended claims and equivalents thereof.

It must be noted that, as used in this specification and the appended claims, the singular forms "a," "an," and "the" include plural referents unless the content clearly dictates otherwise.

"Lightfast" or "colorfast" refers to the quality of the printed image. Thus, the printed images coated with the toner compositions of the present invention tend to retain their color density and detail (as well as show significantly less fading) when exposed to light, e.g., ultraviolet light, as compared to a standard printed image.

"Antioxidant" or "thermal stabilizer" refers to any organic or inorganic compound that is functional within the framework of the present invention and which is added to a toner composition to retard or eliminate oxidation and/or deterioration of the ink or the image.

"Free radical inhibitor" refers to any organic or inorganic compound added to the composition that is functional with the present invention that is used to retard or eliminate any molecular fragment having one or more unpaired electrons, which are usually short-lived and highly reactive.

"Ultraviolet absorber" or "UV absorber" refers to an organic or inorganic substance functional with the present invention that absorbs radiant energy in the ultraviolet wavelength range.

Considerable effort has been expended to improve the light fastness of thermal ink jet inks. Some approaches include using UV-absorbers, free radical inhibitors, thermal stabilizers (antioxidants), or various combinations thereof in ink jet ink formulations, or for coating a substrate prior to applying an image. However, the incorporation of at least two of these additives into a clear toner for coating an ink jet ink print is not presently known in the art. Such formulations provide the dual purpose of increased light fastness, due mainly to the additive(s), and improved water resistance, due mainly to the toner resin.

Specifically, the present invention is drawn to compositions and methods for improving light fastness of an image created by ink jet inks. More specifically, a colorless toner composition for overcoating a print having an ink jet ink image printed thereon is disclosed comprising (a) a toner resin and (b) at least two additives independently selected from the group consisting of ultraviolet absorbers, free radical inhibitors, thermal stabilizers, and combinations thereof. These components of the composition can be present at a ratio of toner resin to total additive at from 1:1 to 99:1 by weight.

In addition to the at least two additives, other ingredients can be included in the colorless toner, such as charge control agents, base resins, and/or low-melt control waxes. In U.S. Pat. Nos. 5,919,592 and 5,905,010, some functional charge control agents, base resins, and low-melt control waxes are described. For example, appropriate charge control agents for use can include metal chelate compounds of alkylsalicylic acid or hydroxynaphthoic acid, quaternary ammonium salts, oxides of metal alkyls, salicylic acid metal complexes, calixarene compounds, and/or organic boron compounds. Appropriate base resins can include styrene resins and/or styrene copolymer resins such as polystyrenes, polychlorostyrenes, polyvinyltoluenes, styrene-vinyltoluene copolymers, styrene-vinylnaphthalene copolymers, styrene-acrylic acid copolymers, styrene-methacrylic acid copolymers, styrene-acrylonitrile copolymers, styrene-butadiene copolymers, and styrene-maleic acid ester copolymers. Other appropriate base resins can include acrylic resins, vinyl resins, ethylenic resins, polyamide resins, polyester resins, phenolic resins, silicone resins, xylene resins, epoxy resins, terpene resins, and rosin and modified rosin, to name a few. With respect to various waxes, carnauba waxes, microcrystalline waxes, paraffin waxes, rice waxes, low molecular weight polypropylenes, low molecular weight polyethylenes, oxidized polypropylene modified by acidic monomers (such as maleic acid) can be used.

With respect to the charge control agent and waxes (if one or both are used), a combined total of from about 1% to 5% by weight of the total composition can be included, though about 2% to 3% is preferred.

The at least two additives are a key to the improved lightfastness performance of ink jet ink prints disclosed herein. In a preferred embodiment, an ultraviolet absorber and a second additive selected from the group consisting of free radical inhibitors and thermal stabilizers can be used. Thus, in one embodiment, a composition comprising a toner resin, an ultraviolet absorber, and a free radical inhibitor can be formulated. In another embodiment, a composition comprising a toner resin, an ultraviolet absorber, and thermal stabilizer (anti-oxidant) can be formulated. The colorless toner can include any toner resin functional for providing polymeric binding capabilities. Almacryl™ T300 is one example of a functional resin. Other standard toner resins such as polystyrenes, polyethylenes, polyesters, polyols, and those described previously can also be used.

The chemical additives primarily act to protect and prevent chemical bond breaking of colorants or polymers used in the ink jet inks and papers. As stated, the additives can be UV-absorbers, free radical inhibitors, thermal stabilizers (antioxidants or oxygen scavengers), or their combinations.

The ultraviolet absorber can be any organic or inorganic compound or composition that absorbs radiant energy in the ultraviolet (UV) wavelength range. However, many compositions sold under the trade name Tinuvin™ are preferred. For example, Tinuvin™ 123, Tinuvin™ 171, Tinuvin™ 384, and Tinuvin™ 1130 are exemplary compositions for use as the ultraviolet absorber. Typically, the structures used as UV absorbers that are sold under the trade name Tinuvin™ contain heterocyclic triaza- groups. The free radical inhibitor can be any organic or inorganic compound added to the composition to retard or eliminate any molecular fragment having one or more unpaired electrons, which are usually short-lived and highly reactive. Examples of good free radical inhibitors can include compositions sold under the trade name Tinuvin™ 292 and Tinuvin™ 622LD, as well as benzophenone. Tinuvin™ 292, for example, is a free radical inhibitor hindered amine that contains an azacyclohexane. The antioxidant or thermal stabilizer such as that sold under the tradename Irgaperm™, particularly Irgaperm™ 2140 can be effective. The total percentage of all additives can be from about 0.1% to 20% by weight at any functional ratio. However, the preferred concentration range is from about from 1% to 6%. Additionally, the ratio of multiple additives to one another can be any functional ratio. If two additives are used, then the ratio of the first additive to the second additive can be from about 1:99 to 1:1 by weight, though this range is not intended to be limiting.

There are several advantages that are realized by the practice of the present invention. Some of these advantages include the following: 1) protection of the color image of the ink jet print, i.e., improved light fastness, perhaps even better than light fastness of pigments; 2) protection binders (resins, polymers, etc.), if used, can prevent image fall off from the media; 3) reduction of expensive dye materials in favor of use of less expensive dye materials with similar light fastness; 4) commercial availability of the additives; 5) improved water-resistance properties; and 6) easy application with no pigment grinding and particle size control.

With one or more toner resins accompanied by charge control agents, waxes, and the necessary additive(s), a mixture is formed that can be melted, blended together, and extruded to a predetermined shape. The material can then be ground, jet milled, and size classified, discarding the particulates that are either too small or too large. Since the clear toner is used to cover the paper and the printed matter uniformly, and not to decorate the print with patterns or features, the final particle size can be considerably bigger than the recent trend of less than or equal to about 7 microns on average. For example, the finished coating thickness can be around 20 microns, though this thickness is not intended to limit the scope of the present invention. Hence, a larger or smaller particle size can be used, provided the toner can be developed. Next, the sized toner can be covered with conventional particulates such as silica or silicon carbide to enhance charge and flow characteristics. Alternatively, the UV absorber can be co-dissolved with a toner resin in a solvent, such as toluene, and spun dry to form the toner particles. This simple toner formation process dispenses with the multi-step grinding and milling, thereby saving energy. In this embodiment, the toner resin is preferably present at from 2 to 20% by weight, the additives are present at from 0.1% to 20% by weight, and a solvent provides the balance. The solvent can be removed by conventional drying methods, such as spray drying.

The clear toner can be applied to the print using any of the standard toner development techniques found in a typical electrophotographic printer. In any event, the toner layer can preferably be uniform in thickness. Since the toner does not need to form any pattern, some of the electrophotographic printer subsystems are not necessary, including the photoconductor, the charging system, and the laser printhead. However, these systems can optionally be retained. In one embodiment a jump developer can be placed directly over the print. There, an electrical ground is placed beneath the print and a biased A/C voltage can be applied to the metal developer roll. With a total gap of 200 to 250 microns between the developer roll and the ground, the required voltage on the developer roll is somewhere around 1200 V peak-to-peak with −800 V bias. In this embodiment, the clear toner is charged negatively to a typical −10 to −20 mC/g.

In another embodiment, the toner uniformity on the print can be improved by first applying the toner onto a conductive elastomeric transfer roll. The transfer roll then moves the toner onto the print electrostatically under light contact pressure. About −500 V applied to the transfer roll is generally sufficient if the electrical ground is directly below the transfer roll. Additionally, voltage of the developer roll should be around −400 V above that of the transfer roll (or a combined potential of about −900 V overall). Since the elastomeric transfer roll is compliant, either a metal or an elastomeric developer roll can be used in this application.

Alternatively, an elastomeric roll can be used to apply toner to a hard pressure-fuser roller. The pressure fuser, working with a hard backup roll underneath, squeezes the toner directly onto the print surface. Pressure fusing of toner has been commercially used in high-speed ionographic printers, as is known by those skilled in the art.

In another embodiment, a developer roll can be spaced from the transfer roll by a larger gap, typically about 75 to 100 microns. The toner is then moved to the transfer roll by an A/C voltage on the developer roll, typically 800 V peak-to-peak with a −500 V bias above the transfer roll. As in the contact development embodiment, the transfer roll can be at around −500 V.

This invention describes the use of a clear toner overcoat including UV absorbers and/or other additives to protect ink jet prints. Thus, the additives should be miscible in the toner base resin and not significantly affect any toner charging characteristics present. The following formulas represent specific structures that can be used as additives in accordance with the present invention. These structure types should not be considered limiting, but are merely intended to show representative classes for each specific additive. Thus, Formula 1 represents a functional group that can be present in an ultraviolet absorber, Formula 2 represents a functional group that can be present in a free radical inhibitor, and Formula 3 illustrates an antioxidant or thermal stabilizer. Each are illustrated below:

Formula 1

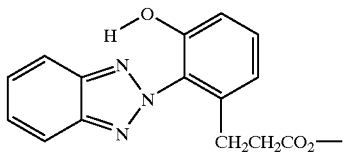

-continued

Formula 2

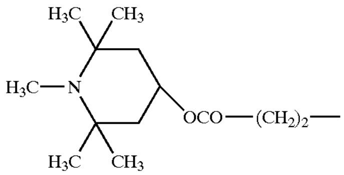

Formula 3

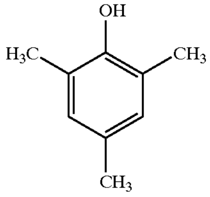

$H_2PO_2$

Two specific ultraviolet absorbers that contain the groups shown in Formula 1 are shown below as Formulas 4 and 5:

EXAMPLES

The following examples illustrate various formulations for preparing the ink jet ink compositions of the present invention. The following examples should not be considered as limitations of the invention, but should merely teach how to make the best known ink formulations based upon current experimental data.

Example 1

To test the effect that coatings containing various additives have on ink jet prints, several formulations were prepared. Specifically, single additives were admixed with a toner resin in toluene. Each solution was coated on printed material having cyan, magenta, and yellow images. As a control, similar images were also coated with a solution containing only toluene and the toner resin. The toluene was allowed to evaporate off and the images were exposed to simulated long term light exposure. In all cases, 85% by weight of toluene was used as the solvent, 10% by weight of Formula 4

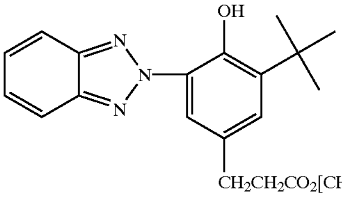

Formula 5

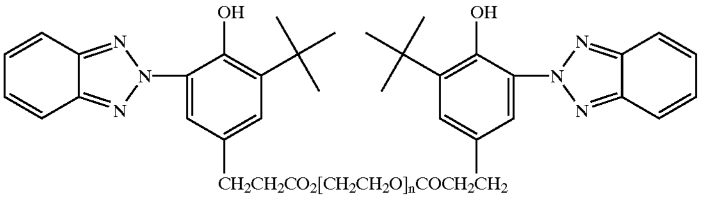

In Formulas 4 and 5 above, n can be an integer from about 1 to 5. A specific free radical inhibitor containing the group depicted in Formula 2 can be seen below in Formula 6:

Formula 6

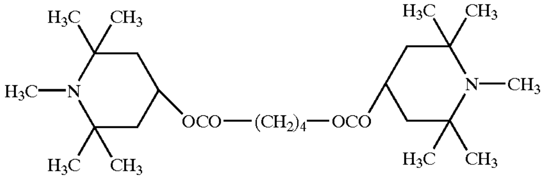

While not wanting to be bound by any theory, this invention provides methods and compositions for improving lightfastness of images. The basic principle to improve lightfastness is to use chemical additives to interact with colorant molecules or polymers of the ink jet ink to prevent chemical bonds from breaking in colorant molecules or polymers, as well as to generally protect the printed image from the elements. The additives can be used in concert to dissipate energy in order to reduce chemical bond breaking. For example, a UV-absorber can be used to dissipate energy of molecules at excited states, a free radical inhibitor can be used to prevent unwanted chemical reactions, and a thermal stabilizer can be used to diminish the oxidation of the dye in the ink composition printed on the coated substrate.

Almacryl™ T300 was used as the toner resin, and 5% of an additive was used. Five different additives were tested with the various colored prints. Specifically, Tinuvin™ 292 (a free radical inhibitor), Tinuvin™ 123 (an ultraviolet absorber), Tinuvin™ 171 (an ultraviolet absorber), Tinuvin™ 384 (an ultraviolet absorber), and Irgaperm™ 2140 (a thermal stabilizer) were tested. With all five additive-containing formulations described above, the lightfastness for each of the printed inks coated with the additive-containing compositions were better by a factor of 2 to 10 than with the printed inks coated with the corresponding control substances.

Example 2

The components described in Table 1 below were blended to form a mixture that was melted in a double-screw kneader and extruded. The extruded matter was then pulverized and jet-milled to produce a powder. The particulates forming the powder were then classified such that essentially all of the particulates fell within a desired volume-average particle size range, i.e., from about 10 and 25 μm, preferably from about 15 and 20 μm.

TABLE 1

| Component | Weight Percentage |
|---|---|
| Polyester resin (glass transition temperature about 58° C.) | 90 |
| Chromium azo complex (negative charge control agent) | 2 |
| carnauba wax (low-melt wax) | 3 |
| Tinuvin 1130 (UV absorber) | 3 |
| Tinuvin 292 (free radical inhibitor) | 2 |

Once formed, the particles were then mixed with a hydrophobic fumed-silica flow agent at a weight ratio of about 1 part silica to 1000 parts particulate. A toner resin, enhanced with an ultraviolet absorber and a free radical inhibitor, was formed that can be used for imparting an essentially clear coating.

EXAMPLE 3

The components described in Table 2 below were blended to form a mixture that was melted in a double-screw kneader and extruded. The extruded matter was then pulverized and jet-milled to produce a powder. The particulates within the powder were then classified such that essentially all of the particulates fell within a desired volume-average particle size range, i.e., from about 10 and 25 μm, preferably from about 15 and 20 μm.

TABLE 2

| Component | Weight Percentage |
|---|---|
| Polyol resin (glass transition temperature about 60° C.) | 90 |
| zinc salicylate (complex negative charge-control agent) | 2 |
| paraffin wax (low-melt wax) | 3 |
| Tinuvin 234 | 3 |
| Irgaperm 2140 | 2 |

Once formed, the particles were then mixed with a hydrophobic fumed-silica flow agent at a weight ratio of about 1 part silica to 1000 parts particulate. A toner resin, enhanced with a free radical inhibitor and a thermal stabilizer (anti-oxidant), was formed that can be used for providing an essentially clear coating on an ink jet print.

While the invention has been described with reference to certain preferred embodiments, those skilled in the art will appreciate that various modifications, changes, omissions, and substitutions can be made without departing from the spirit of the invention. It is therefore intended that the invention be limited only by the scope of the appended claims.

We claim:

1. A method of creating and protecting an image on a substrate, comprising:

ink-jetting an image on a substrate; and overcoating the image with a toner composition comprising:

a colorless toner resin, and at least two additives independently selected from the group consisting of ultraviolet absorbers, free radical inhibitors, and thermal stabilizers, wherein the ratio of said toner resin to said additives is from about 1:1 to 99:1 by weight.

2. A method as in claim 1 wherein one of the at least two additives is a free radical inhibitor.

3. A method as in claim 1 wherein one of the at least two additives is an ultraviolet absorber.

4. A method as in claim 1 wherein one of the at least two additives is a thermal stabilizer.

5. A method as in claim 1 wherein at least three additives are present including ultraviolet absorbers, free radical inhibitors, and thermal stabilizers.

6. A method as in claim 1 wherein said toner resin is selected from the group consisting of styrene resins, styrene copolymer resins, polyethylenes, polyethers, polyols, acrylic resins, vinyl resins, ethylenic resins, polyamide resins, polyester resins, phenolic resins, silicone resins, xylene resins, epoxy resins, terpene resins, rosins, modified rosins, and combinations thereof.

7. A method as in claim 6 wherein the toner resin is a styrene selected from the group consisting of polystyrenes, polychlorostyrenes, polyvinyltoluenes, styrene-vinyltoluene copolymers, styrene-vinylnaphthalene copolymers, styrene-acrylic acid copolymers, styrene-methacrylic acid copolymers, styrene-acrylonitrile copolymers, styrene-butadiene copolymers, and styrene-maleic acid ester copolymers.

8. A method as in claim 5 wherein the ultraviolet absorbers contain a functional group having the structure:

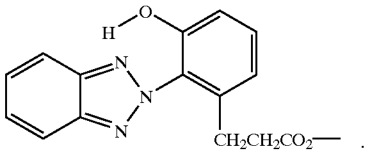

9. A method as in claim 5 wherein the free radical inhibitors contain a functional group having the structure:

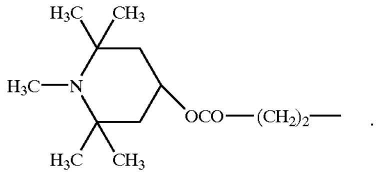

10. A method as in claim 5 wherein the thermal stabilizers have the structure:

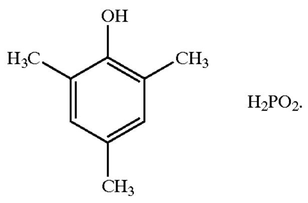

11. A method as in claim 5 wherein the thermal stabilizers are selected from the group consisting of phenols, phosphates, and combinations thereof.

12. A method as in claim 8 wherein the ultraviolet absorbers are defined by a structure selected from the group consisting of

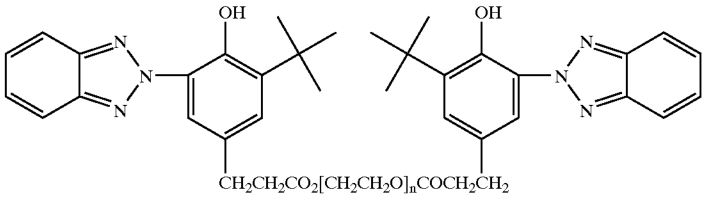
and
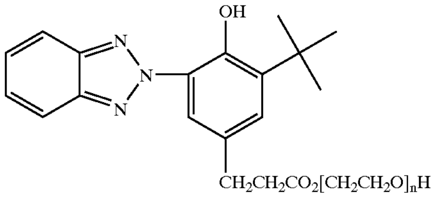
wherein n is an integer from about 1 to 5.
13. A method as in claim 9 wherein the free radical inhibitors are defined by the structure:
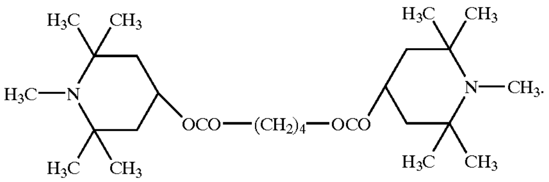
14. A method as in claim 1 further comprising an effective amount of a charge control agent.
15. A method as in claim 1 further comprising a low-melt wax.
* * * * *